United States Patent
Sun et al.

(10) Patent No.: US 11,108,823 B2
(45) Date of Patent: Aug. 31, 2021

(54) RESOURCE SECURITY SYSTEM USING FAKE CONNECTIONS

(71) Applicant: International Business Machines Corporation, Armonk, NY (US)

(72) Inventors: Sheng Yan Sun, Beijing (CN); Shuo Li, Beijing (CN); Xiaobo Wang, Beijing (CN); Hong Mei Zhang, Beijing (CN); Yu Wang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 228 days.

(21) Appl. No.: 16/050,491

(22) Filed: Jul. 31, 2018

(65) Prior Publication Data
US 2020/0045078 A1  Feb. 6, 2020

(51) Int. Cl.
*H04L 29/06* (2006.01)
*G06F 21/62* (2013.01)

(52) U.S. Cl.
CPC ...... *H04L 63/1491* (2013.01); *G06F 21/6218* (2013.01); *H04L 63/10* (2013.01);
(Continued)

(58) Field of Classification Search
CPC . H04L 63/1491; H04L 63/10; H04L 63/1416; H04L 63/1425; H04L 63/20;
(Continued)

(56) References Cited

U.S. PATENT DOCUMENTS

| 8,370,920 | B2 * | 2/2013 | Garrard | H04L 63/0869 |
| | | | | 726/14 |
| 8,763,126 | B2 * | 6/2014 | Wang | H04L 63/145 |
| | | | | 726/24 |

(Continued)

FOREIGN PATENT DOCUMENTS

| CN | 101388763 B | 2/2011 |
| WO | 2018053337 A1 | 3/2018 |

OTHER PUBLICATIONS

Jose Nazario, PhoneyC: A Virtual Client Honeypot, https://www.usenix.org/legacy/events/leet09/tech/full_papers/nazario/nazario.pdf, Apr. 1, 2009, pp. 1-8.*

(Continued)

*Primary Examiner* — Jeffery L Williams
*Assistant Examiner* — Raied A Salman
(74) *Attorney, Agent, or Firm* — Yee & Associates, P.C.

(57) ABSTRACT

A method, an apparatus, a system, and a computer program product for handling security threats in a network data processing system. A computer system determines a connection type for a connection in response to detecting the connection between a target resource in the network data processing system and a requestor. The computer system redirects the connection to a virtual resource in place of the target resource when the connection type is a threat connection, wherein the requestor originating the connection to the target resource is unable to perceive a redirection of the connection to the virtual resource. The computer system records information in the connection redirected to the (Continued)

virtual resource to form recorded information. The computer system adjusts a security policy for handling connections in the network data processing system using the recorded information, wherein the security threats in the network data processing system are decreased using the security policy.

20 Claims, 6 Drawing Sheets

(52) U.S. Cl.
CPC ...... *H04L 63/1416* (2013.01); *H04L 63/1425* (2013.01); *H04L 63/20* (2013.01)

(58) Field of Classification Search
CPC ............. H04L 63/1408; H04L 63/1433; G06F 21/6218
See application file for complete search history.

(56) References Cited

U.S. PATENT DOCUMENTS

| | | | | |
|---|---|---|---|---|
| 9,654,481 | B1* | 5/2017 | Ho | H04L 9/32 |
| 9,680,830 | B2 | 6/2017 | Feng et al. | |
| 9,703,854 | B2 | 7/2017 | Feng et al. | |
| 9,916,439 | B2* | 3/2018 | Jakubowski | G06F 21/53 |
| 10,164,982 | B1* | 12/2018 | Lazarovitz | H04W 12/1204 |
| 10,628,228 | B1* | 4/2020 | Theunissen | G06F 9/5077 |
| 10,735,466 | B2* | 8/2020 | Wright | H04L 63/1425 |
| 2005/0257243 | A1 | 11/2005 | Baker | |
| 2005/0265331 | A1* | 12/2005 | Stolfo | G06F 21/55 |
| | | | | 370/389 |
| 2007/0143850 | A1* | 6/2007 | Kraemer | G06F 21/56 |
| | | | | 726/25 |
| 2008/0134300 | A1* | 6/2008 | Izatt | H04L 63/10 |
| | | | | 726/4 |
| 2012/0151587 | A1* | 6/2012 | Wang | H04L 63/145 |
| | | | | 726/24 |
| 2014/0096229 | A1* | 4/2014 | Burns | H04L 63/1491 |
| | | | | 726/15 |
| 2015/0128246 | A1* | 5/2015 | Feghali | H04L 63/0209 |
| | | | | 726/13 |
| 2016/0065600 | A1* | 3/2016 | Lee | H04L 63/1416 |
| | | | | 726/23 |
| 2017/0171244 | A1* | 6/2017 | Vissamsetty | H04L 63/1425 |
| 2017/0364576 | A1 | 12/2017 | Chesla et al. | |
| 2018/0084085 | A1* | 3/2018 | Shanmugasundaram | H04L 12/2818 |
| 2018/0343238 | A1* | 11/2018 | Tola | H04L 9/3263 |
| 2019/0058733 | A1* | 2/2019 | Wright | H04L 63/1425 |
| 2019/0278928 | A1* | 9/2019 | Rungta | G06F 9/44505 |
| 2019/0364073 | A1* | 11/2019 | Jones | G06F 21/566 |
| 2020/0220875 | A1* | 7/2020 | Harguindeguy | H04L 63/101 |

OTHER PUBLICATIONS

Kris Wenzel, "What is a Database Table?", https://www.essentialsql.com/what-is-a-database-table/; May 6, 2014, accessed Jan. 2, 2021; p. 1-4. (Year: 2014).*

"System and method of virtual fake connection to trace the purpose of attacking," ip.com Disclosure No. IPCOM000238162D, publication date Aug. 6, 2014, 2 pages. https://priorart.ip.com/IPCOM/000238162.

Rauti et al., "A survey on fake entities as a method to detect and monitor malicious activity," 2017 25th Euromicro International Conference on Parallel, Distributed and Network-based Processing (PDP,) Mar. 6-8, 2017, 5 pages. https://research.utu.fi/converis/getfile?id=25429824&portal=true.

"Database tables decomposition and re-aggregation with data fogging and security purposes," ip.com Disclosure No. IPCOM000200475D, publication date Oct. 15, 2010, 3 pages. https://priorart.ip.com/IPCOM/000200475.

* cited by examiner

RESOURCE SECURITY SYSTEM USING FAKE CONNECTIONS

BACKGROUND

1. Field

The disclosure relates generally to an improved computer system and, more specifically, to improved security for accessing a computer resource in a network data processing system.

2. Description of the Related Art

Databases are organized collections of data that are stored and accessed by users operating client devices. With the increased use of cloud computing, databases are increasingly located in the cloud. By moving or placing databases in the cloud, access can occur from any location where a connection to the Internet is present.

Various cloud database services are available. These services include both relational and NoSQL databases. A cloud database service provider is responsible for maintaining the database, providing structure, and other infrastructure. With cloud database services, flexible scalability is present. For example, automatic scalability can be applied during peak business hours or for unexpected spikes in usage. These services are cost-effective and reduce the need to update infrastructure by customers purchasing these services.

Larger and larger amounts of data are being collected, processed, and distributed using cloud databases. The data can include confidential information and the data may also have high compliance requirements. With cloud database services, the increased access and availability is present over the Internet. This increased access and availability also increases exposure to potential unauthorized access to these types of databases. Currently, security policies are utilized to protect the databases from unauthorized access to sensitive information in the databases. These security policies cut connections when actions are performed that indicate an attempt at unauthorized access to the database. With current security policies, however, updating the security policies is more difficult because determining what additional actions or future may be taken are unknown. As a result, some connections can be terminated even though the client is actually authorized to access information in the database.

Therefore, it would be desirable to have a method and apparatus that take into account at least some of the issues discussed above, as well as other possible issues. For example, it would be desirable to have a method and apparatus that overcome a technical problem with refining security policies regulating access to a resource such as a database.

SUMMARY

According to one embodiment of the present invention, a method handles security threats in a network data processing system. A computer system determines a connection type for a connection in response to detecting the connection between a target resource in the network data processing system and a requestor. The computer system redirects the connection to a virtual resource in place of the target resource when the connection type is a threat connection, wherein the requestor originating the connection to the target resource is unable to perceive a redirection of the connection to the virtual resource. The computer system records information in the connection redirected to the virtual resource to form recorded information. The computer system adjusts a security policy for handling connections in the network data processing system using the recorded information, wherein the security threats in the network data processing system are decreased using the security policy.

According to another embodiment of the present invention, a computer security system comprises a computer system and a connection manager running on the computer system. The connection manager determines a connection type for a connection in response to detecting the connection between a target resource in the network data processing system and a requestor. The connection manager redirects the connection to a virtual resource in place of the target resource when the connection type is a threat connection. The requestor originating the connection to the target resource is unable to perceive a redirection of the connection to the virtual resource. The connection manager records information in the connection redirected to the virtual resource to form recorded information. The connection manager adjusts a security policy for handling connections in the network data processing system using the recorded information, wherein security threats in the network data processing system are decreased using the security policy.

According to yet another embodiment of the present invention, a computer program product handles security threats in a network data processing system. The computer program product comprises a computer-readable storage media, first program code, second program code, third program code, and fourth program code stored on the computer-readable storage media. The first program code is run to determine a connection type for a connection in response to detecting the connection between a target resource in the network data processing system and a requestor. The second program code is run to redirect the connection to a virtual resource in place of the target resource when the connection type is a threat connection, wherein the requestor originating the connection to the target resource is unable to perceive a redirection of the connection to the virtual resource. The third program code is run to record information in the connection redirected to the virtual resource to form recorded information. The fourth program code is run to adjust a security policy for handling connections in the network data processing system using the recorded information, wherein the security threats in the network data processing system are decreased using the security policy.

DETAILED DESCRIPTION

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account that it would be desirable to have more intelligent and lower impact security systems for resources, such as databases, accessed over the Internet. The illustrative embodiments recognize and take into account that currently available security systems are rule-based and terminate a connection identified as an attack. The illustrative embodiments recognize and take into account that predefined security rules are typically coarse and can terminate connections that are authorized to access a database. The illustrative embodiments also recognize and take into account that with the current security systems for databases, updating of rules is performed at a lower than desired rate. Further, the illustrative embodiments recognize and take into account that with the termination of the connection, the security system cannot predict what actions may be taken next time when the same party establishes a connection to the database.

Thus, the illustrative embodiments provide a method, an apparatus, a system, and a computer program product handling security threats in a network data processing system. In one illustrative example, a method is present for handling security threats in a network data processing system. Responsive to detecting a connection between a target resource in the network data processing system and a requestor, a connection manager running on a computer system determinizes a connection type for the connection. The connection manager redirects the connection to a virtual resource in place of the target resource when the connection type is a security threat. An attacker originating the connection to the target resource is unable to perceive a redirection of the connection to the virtual resource. The connection manager records information in the connection redirected to the virtual resource to form recorded information. The connection manager adjusts a security policy for handling connections in the network data processing system using the recorded information, wherein security threats on the network data processing system are decreased using the security policy.

Figure 1:
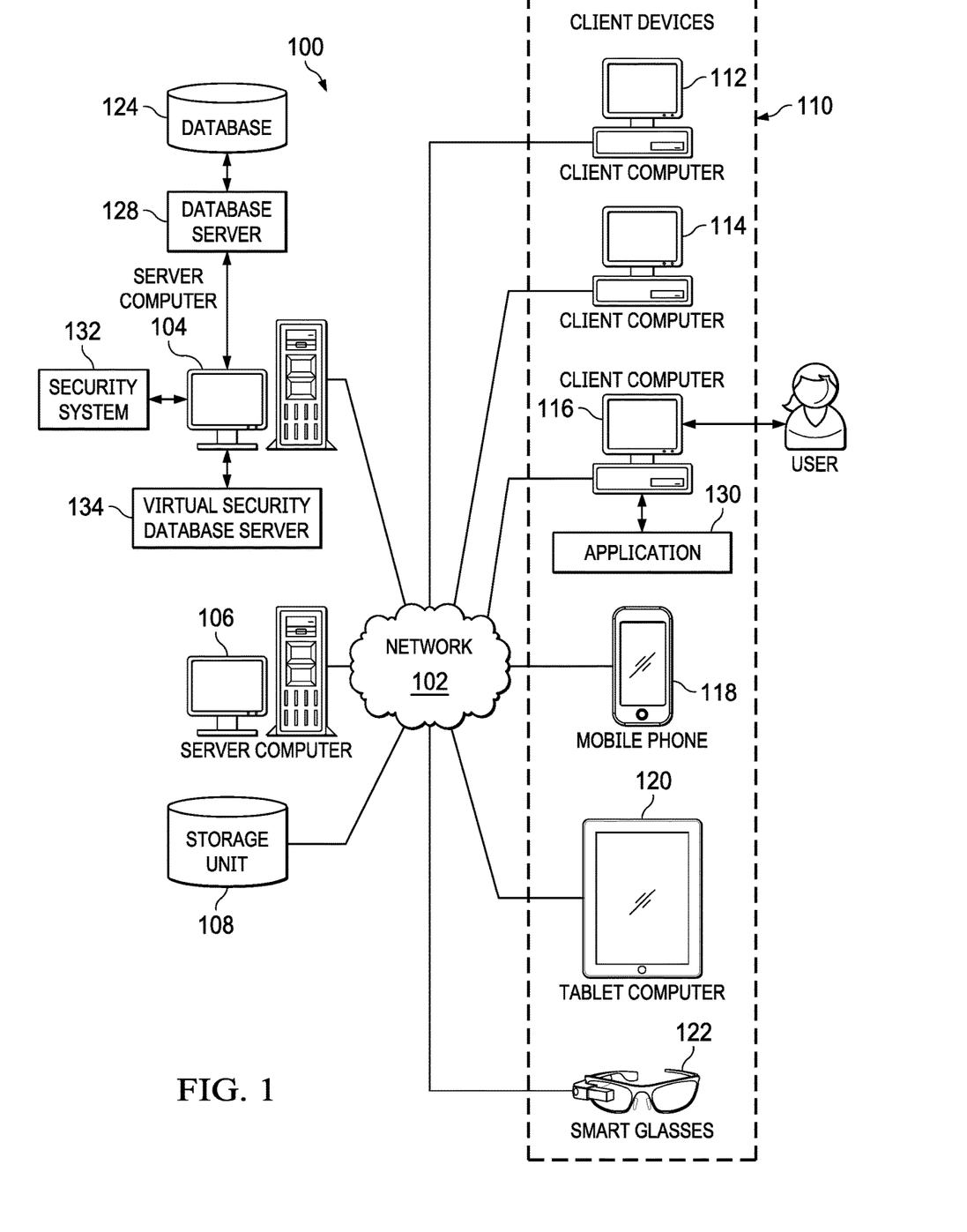
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 may be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, some or all of client devices 110 may form an Internet of Things (IoT) in which these physical devices can connect and exchange data.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 may be stored on a computer-recordable storage medium and downloaded to a data processing system or other device for use. For example, program code may be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 may be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, database 124 is located on server computer 106. User 126, using application 130 on client computer 116, can establish a connection to database server 128 on server computer 104 through client computer 116 to access information in database 124. Application 130 can take a number of different forms. For example, application 130 can be a web browser, a mobile application, a client database application, or some other suitable type of application.

In this illustrative example, security system 132 runs on server computer 104. Security system 132 monitors actions in the connection between client computer 116 and server computer 104. In this illustrative example, when actions are defined identified as being a threat, the connection from application 130 on client computer 116 to database server 128 can be switched to virtual security database server 134.

This switch creates a fake connection between virtual security database server 134 and application 130. In other words, virtual security database server 134 is a virtual version of database server 128. In this example, session information may be synchronous between database server 128 and virtual security database server 134. For example, when connections are in a pool, the session information for the connection to database server 128 is used by virtual security database server 134 to maintain a session with application 130. As a result, the session information for the connection between database server 128 and application 130 is maintained for use by virtual security database server 134.

Virtual security database server 134 can provide responses to requests or commands generated by application 130. The responses are ones that would be expected from database server 128. However, the information contained in these responses are useless to user 126. For example, the responses may contain information that appears to be personally identifiable information when a request sent by application 130 for information about one or more people. The information in these responses does not correspond to any real person in database 124. In other words, the information is false or incorrect and thus useless to user 126. As another example, in response to a request for financial information, the responses may contain financial information that is inaccurate.

In this illustrative example, the information provided by virtual security database server 134 can be located in at least one of virtual security database server 134 or a virtual database constructed with tables similar to those in database 124. These tables, however, do not include sensitive, confidential information or other information that should be protected from access by unauthorized users.

With this fake connection between application 130 and virtual security database server 134, security system 132 can obtain information about at least one of application 130 for user 126. Information can be obtained without a risk of information in database 124 being changed, deleted, downloaded, or otherwise accessed by user 126.

With this information obtained from the connection between application 130 and virtual security database server 134, changes can be made to security system 132 to improve the detection of actions from computers or other devices within or outside of network data processing system 100 that may be security threats to database server 128. Further, these improvements can include at least one of improving the ability to detect attacks, reducing the termination of normal connections that may be incorrectly identified as threat connections, or other improvements that increase security for network data processing system 100. An attack is any action that attempts to expose, alter, disable, destroy, steal, or gain unauthorized access to or make unauthorized use of a resource.

Figure 2:
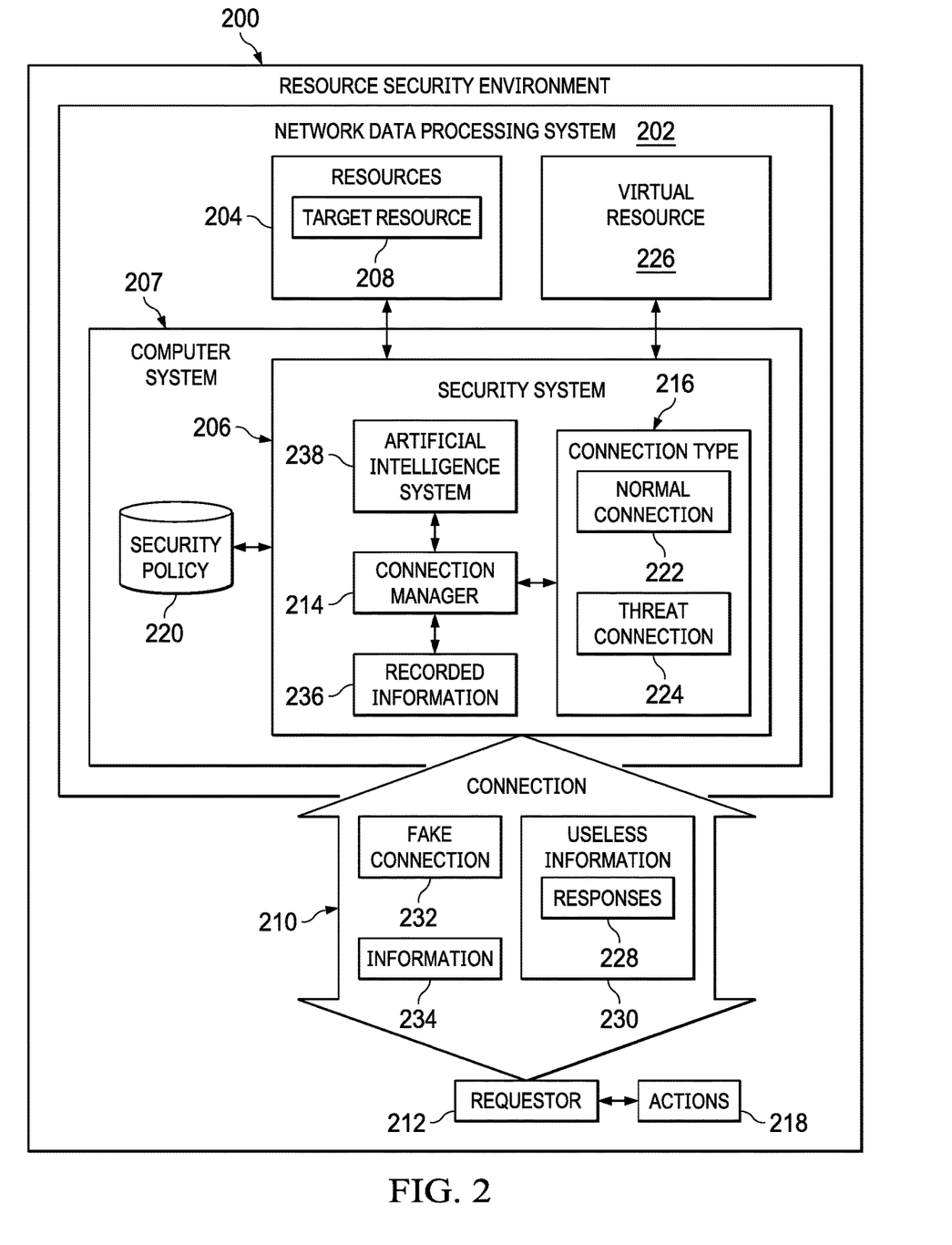
FIG. 2 is a block diagram of a resource security environment in accordance with an illustrative embodiment.

With reference next to FIG. 2, a block diagram of a resource security environment is depicted in accordance with an illustrative embodiment. Resource security environment 200 includes network data processing system 202 which contains resources 204. Network data processing system 100 in FIG. 1 is an example of one implementation for network data processing system 202. Network data processing system 202 can include one or more networks. For example, network data processing system 202 can be the Internet. In other illustrative examples, network data processing system 202 can be a local area network or can be the Internet and other types of networks.

As depicted, security system 206 handles security threats within network data processing system 202. In this illustrative example, security system 206 is located in computer system 207 in network data processing system 202. Computer system 207 is a physical hardware system that includes one or more data processing systems. When more than one data processing system is present, those data processing systems are in communication with each other using a communications medium. The communications medium may be a network. The data processing systems may be selected from at least one of a computer, a server computer, a network appliance, or some other suitable data processing system.

Security system 206 is configured to protect resources 204 in network data processing system 202. Resources 204 can take a number of different forms. For example, resources 204 can be selected from at least one of a hard drive, a switch, a router, an application, a Web server, a database, a file, a memory, a computer, a server computer, or some other type of resource.

As depicted, security system 206 protects target resource 208 in resources 204 from undesired access within network data processing system 202, outside of network data processing system 202, or both. Responsive to detecting connection 210 between target resource 208 in network data processing system 202 and requestor 212, connection manager 214 in security system 206 determines connection type 216 for connection 210.

As depicted, connection type 216 can be identified based on a set of actions 218 performed by requestor 212. As used herein, "a set of," when used with reference items, means one or more items. For example, "a set of actions 218" is one or more of actions 218. Connection type 216 is identified by applying security policy 220 to at least one of the set of actions or other information for connection 210. Requestor 212 is an application or hardware device that uses normal connection 222 and threat connection 224.

Security policy 220 is a set of rules that defines whether actions 218 are normal, threats, or some combination thereof. Security policy 220 can also include data that is used to apply the set of rules to actions 218. For example, security policy 220 can include rules that identify a sequence of actions 218 that are considered normal. Security policy 220 can also include rules that identify the sequence of actions 218 that are a threat.

In this illustrative example, connection type 216 can be selected from a group comprising normal connection 222 and threat connection 224. Connection 210 can be classified as normal connection 222 and threat connection 224 based on the application of security policy 220 to actions 218 or other information for connection 210. When connection type 216 is normal connection 222, connection 210 to target resource 208 remains with target resource 208. In this case, connection manager 214 continues to allow access to target resource 208 using connection 210 when connection 210 is normal connection 222.

When connection type 216 is threat connection 224, connection manager 214 redirects connection 210 to virtual resource 226 in place of target resource 208. In this case, requestor 212 for connection 210 is unable to perceive a redirection of connection 210 from target resource 208 to virtual resource 226.

The redirection of connection 210 can be performed in a number of different ways. For example, connection manager 214 can analyze data packets in traffic flow between requestor 212 and target resource 208. Virtual resource 226 can create data packets that include information indicating that the data packets are from target resource 208 such that requestor 212 does not realize connection 210 has switched from target resource 208 to virtual resource 226 when responses are sent by virtual resource 226, normal connection 222, and threat connection 224.

Virtual resource 226 returns responses 228 over connection 210 to requestor 212 that are expected. As depicted, responses 228 include useless information 230. In other words, useless information 230 does not include real, personally identifiable information, financial information, or other information that is considered confidential or sensitive. Connection 210 becomes fake connection 232.

As depicted, connection manager 214 records information 234 in connection 210 redirected to virtual resource 226 to form recorded information 236. Information 234 includes actions 218. For example, information 234 can include a sequence of actions 218. Also, information 234 can include data derived from actions 218. For example, if a particular action is a request for a particular piece of information, the piece of information requested can be included. Further, a determination whether this information is confidential can also be identified and included as part of information 234. In this illustrative example, connection manager 214 terminates connection 210 after a desired amount of information 234 is recorded from connection 210 to virtual resource 226.

In this illustrative example, connection manager 214 analyzes recorded information 236 for connection 210 redirected to virtual resource 226. This analysis can be performed in a number of different ways. For example, connection manager 214 can include or communicate with artificial intelligence system 238 to perform this analysis. Artificial intelligence system 238 is a system that is based on function of the human brain. Artificial intelligence system 238 comprises at least one of an artificial neural network, a cognitive system, a Bayesian network, a fuzzy logic, an expert system, a natural language system, a cognitive system, or some other suitable system. Machine learning is a used to train a process or an artificial intelligence system. Machine learning involves inputting data to the process and allowing the process to adjust and improve the function of the artificial intelligence system.

Connection manager 214 adjusts security policy 220 for handling connections in network data processing system 202 using recorded information 236, wherein attacks on network data processing system 202 are managed more accurately using security policy 220. In the illustrative example, this adjustment of security policies 220 can be performed dynamically as information feedback is obtained from connections transferred to virtual resource 226.

Connection manager 214 may be implemented in software, hardware, firmware, or a combination thereof. When software is used, the operations performed by connection manager 214 may be implemented in program code configured to run on hardware, such as a processor unit. When firmware is used, the operations performed by connection manager 214 may be implemented in program code and data and stored in persistent memory to run on a processor unit. When hardware is employed, the hardware may include circuits that operate to perform the operations in connection manager 214.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In one illustrative example, one or more technical solutions are present that overcome a technical problem with refining security policies regulating access to a resource such as a database. One or more technical solutions redirect connections from target resources to virtual resources such that the information about an attack can be collected. As a result, one or more technical solutions provide a technical effect of increasing the ability to identify security threats to the computer system or other components in a network data processing system. Further, one or more technical solutions provide a technical effect of reducing false identifications of security threats.

Further, one or more technical solutions provide a technical effect of increasing the performance of target resource 208. By redirecting connection 210 to virtual resource 226, one or more technical solutions provide a technical effect of reducing use of target resource 208. For example, at least one of the generation and sending of responses 228 to requestor 212 and recoding of information 234 can be performed through at least one of connection manager 214 or virtual resource 226 rather than by target resource 208. As a result, target resource 208 has increased availability and reduced response time to process requests. Further, reduced overhead can occur for target resource 208. In addition, one or more technical solutions provide a technical effect of reducing exposure of target resource 208.

In one illustrative example, one or more technical solutions provide a technical effect of protecting information in target resource 208. For example, target resource 208 is a database. The database can contain personally identifiable information, financial information, business plans, client lists, or other information that may be considered confidential. With connection manager 214, security policy 220 can be adjusted to become more accurate in identifying actual security threats to resources 204 in network data processing system 202 as compared to currently used techniques. In this manner, at least one of computer system 207 or network data processing system 202 is improved as compared to other computer systems or network data processing systems that do not include at least one of connection manager 214 or virtual resource 226.

As a result, computer system 207 operates as a special purpose computer system in which connection manager 214 in computer system 207 enables improving the security against threats in at least one of computer system 207 or network data processing system 202. In particular, connection manager 214 transforms computer system 207 into a special purpose computer system as compared to currently available general computer systems that do not have connection manager 214. Further, attacks on network data processing system 202 are made more difficult using one or more technical solutions. For example, a party attacking network data processing system 202 is unable to identify actual security boundaries in network data processing system 202 with the use of connection manager 214 redirecting direct connections to virtual resource 226. This action is in contrast to a simple termination of the connection as is performed for current resources, such as a database.

The illustration of resource security environment 200 and the different components in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although the different operations described in this example are with respect to connection manager 214 as a single component, the different operations can be performed in multiple components. For example, the analysis of the information collected by connection manager 214 can be analyzed in another component such as a security analyzer. The security analyzer can include an artificial intelligence system that is configured to identify actions that are threats versus actions that are normal. This analysis can be used to make changes to policy used by security system 206 in network data processing system 202 to protect resources 204 from unauthorized access or other types of attacks.

In another illustrative example, the rules in security policy 220 can include rules that identify connection type 216 as other types in addition to or in place of normal connections and threat connections. For example, connection type 216 can include a suspect connection in addition to a normal connection and a threat connection. Further, connection manager 214 can terminate connection 210 to target resource 208 without redirecting connection 210 to virtual resource 226 when connection 210 is threat connection 224 in which additional information is unnecessary. This determination can be made using security policy 220. For example, connections from a particular requester, an Internet protocol (IP) address, or a media access control (MAC) address can be identified as always originating attacks on resources 204. With this type of case, additional information may not be needed.

In another example, a threat level can be identified when connection 210 is determined to be threat connection 224. The threat level can be identified using security policy 220. The rules can assign values or levels based on at least one of the connection or actions. The action taken can then be based on the threat level. For example, an alert message can be sent, the connection can be logged with access to target resource continuing, some other action can be performed by connection manager 214 based on the threat level.

In still another illustrative example, virtual resource 226 can be located in computer system 207. In addition, resource security environment 200 also can include one or more virtual resources in addition to virtual resource 226. Connection manager 214 can run on a single data processing system in computer system 207 or can be distributed across different data processing systems in computer system 207.

Figure 3:
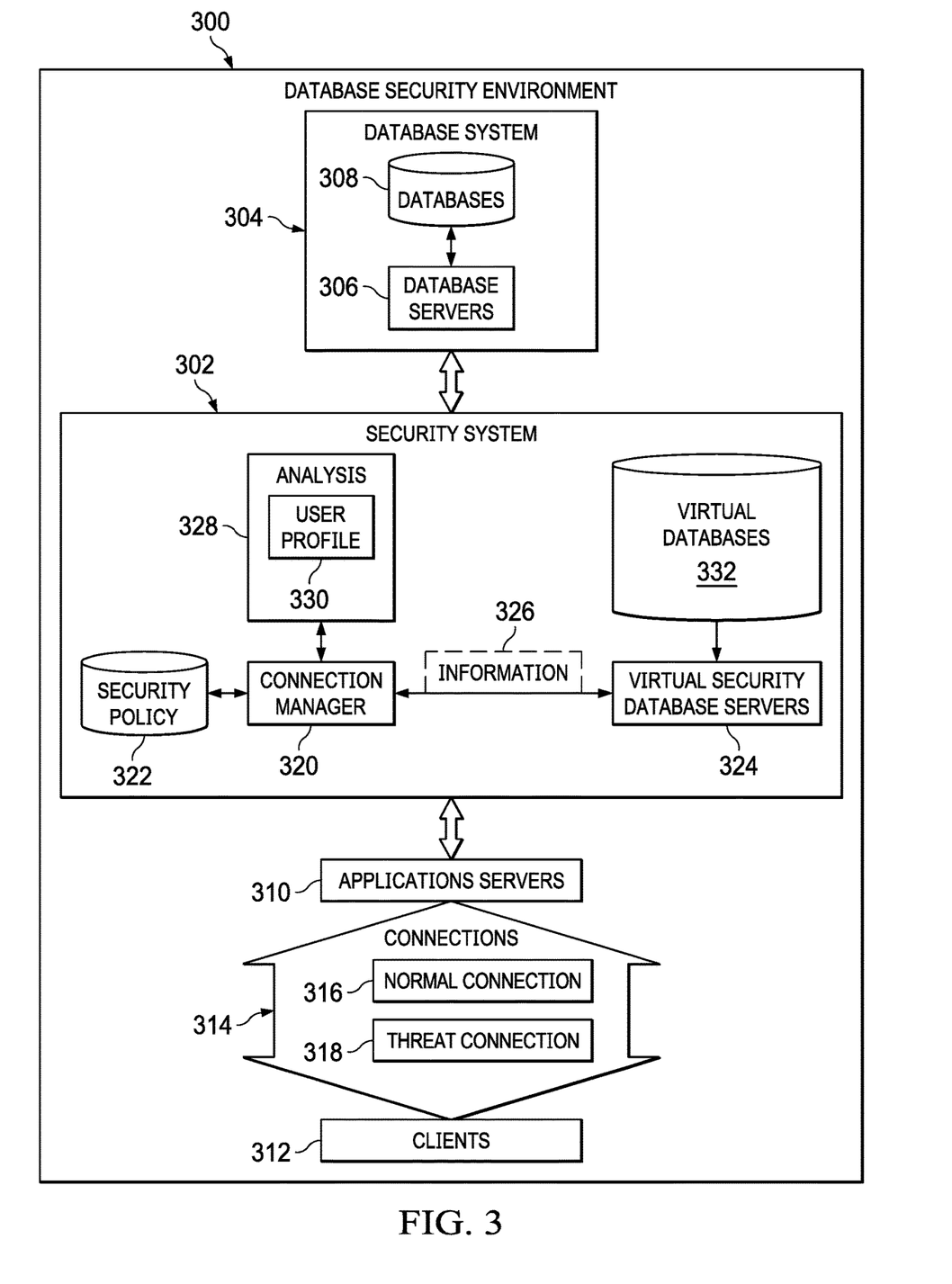
FIG. 3 is a block diagram of a database security environment in accordance with an illustrative embodiment.

Turning now to FIG. 3, a block diagram of a database security environment is depicted in accordance with an illustrative embodiment. In this depicted example, database security environment 300 is an example of an implementation for resource security environment 200 in FIG. 2. In this example, security system 302 protects database system 304. As depicted, database system 304 includes database servers 306 and databases 308. Database system 304 is an example of target resource 208 in FIG. 2. Database system 304 is a cloud database system in this illustrative example.

Database servers 306 are applications that provide database services. For example, the services are provided with application servers 310 as an interface. As depicted, application servers 310 are interfaces that handle requests from clients 312 for information in database system 304. In other words, application servers 310 handle inputs and queries received from clients 312 and make the appropriate queries to database servers 306 in database system 304 to obtain information from databases 308.

In this illustrative example, connections 314 are present between clients 312 and database servers 306 via application servers 310. Different types of connections 314 can be present. For example, connections 314 can include normal connection 316 and threat connection 318.

The identification of connection type for connections 314 is made using connection manager 320. Connection manager 320 is an example of an implementation for connection manager 214 in FIG. 2 in which connection manager 320 is configured to manage connections to database servers 306. This identification can be made using security policy 322. As depicted, security policy 322 contains rules used to identify which actions are normal connection 316 and which actions are threat connection 318.

Normal connection 316 continues between clients 312 and database servers 306. In this illustrative example, threat connection 318 is switched to virtual security database servers 324. Virtual security database servers 324 include or have access to table structures in virtual databases 332 that are similar to table structures in databases 308 in database system 304. The table structures provide credible information that avoids a requestor, such as a client in clients 312, from noticing that the connection has been redirected to a virtual security database server.

The information provided by virtual security database servers 324 is not useful to clients 312, having threat connection 318, that is switched to virtual security database servers 324. In other words, responses provided by virtual security database servers 324 are consistent with responses that would have been made by databases servers 306 to avoid clients 312 detecting a change from database servers 306 to virtual security database servers 324.

Virtual databases 332 with virtual security database servers 324 are created to provide information that is logically the same as database servers 306 and databases 308. In other words, the responses are indistinguishable from those provided by database servers 306. However, information provided from responses do not provide actual real information in databases 308.

As depicted, virtual databases 332 can be created from databases 308. For example, tables in databases 308 can be used in virtual databases 332. The data in the tables are mutated or changed from actual data such that the actual data that is to be protected is not present in virtual databases 332. The change may be made such that the information in the tables contain the type of information based on the table architecture. However, the information is useless to the requestor.

The information is logical but not correct. For example, the types of information such as usernames, passwords, telephone numbers, home addresses, and other information in databases 308 are also present in virtual databases 332. This information is changed or mutated such that the usernames, passwords, telephone numbers, home addresses, and other information are not correct or real. As a result, a request for a telephone number and home address for a user will return a telephone number and a home address from virtual databases 332. However, the telephone number and the home address in the response are not the actual telephone number and home address for the user.

In this illustrative example, information 326 is identified from actions by clients 312 having threat connection 318. In this illustrative example, the switched connection becomes a fake connection. Information 326 may include the sequence of actions. Information 326 also include other information such as an Internet protocol address, a domain name of the client's Internet service provider (ISP), an IP geolocation, a browser, computer system information, and other information.

Information 326 is analyzed by connection manager 320 to generate analysis 328. Analysis 328 also can include user profile 330. User profile 330 is information about a user originating a threat connection. This user profile can identify behavior of the user. For example, user profile 330 can include information selected from at least one of a connection program, a network protocol, an Internet protocol address, a browser identification, computer system information, a connection time, a structured query language (SQL) statement content, database objects requested, a sequence of SQL statements, types of actions, a sequence of actions, or other suitable information characterizing the user.

In this illustrative example, information 326 and analysis 328 can be used by connection manager 320 to update security policy 322. The update can include machine learning if connection manager 320 includes an artificial intelligence system. In this manner, virtual security database servers 324 can provide feedback for improving or refining security policy 322.

Figure 4:
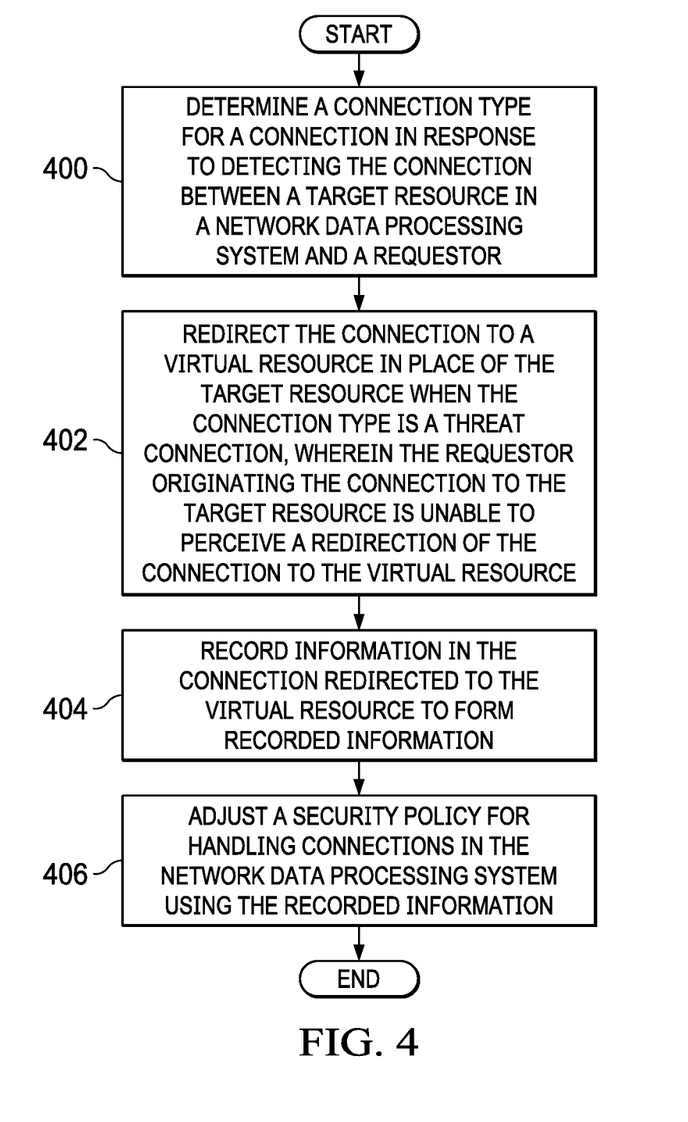
FIG. 4 is a flowchart of a process for handling security threats in a network data processing system in accordance with an illustrative embodiment.

Turning next to FIG. 4, a flowchart of a process for handling security threats in a network data processing system is depicted in accordance with an illustrative embodiment. The process can be implemented in hardware, software, or some combination thereof. When implemented in software, the processes can take the form of program code that is run by one of more processor units located in one or more hardware devices in one or more computer systems. For example, these processes can be implemented in computer system 207 with connection manager 214 in FIG. 2.

The process begins by determining a connection type for a connection in response to detecting the connection between a target resource in a network data processing system and a requestor (step 400). The process redirects the connection to a virtual resource in place of the target resource when the connection type is a threat connection, wherein the requestor originating the connection to the target resource is unable to perceive a redirection of the connection to the virtual resource (step 402).

In step 402, the redirection can be made after the sequence of actions is performed. In another illustrative example, the redirection of the connection can be made as the request for the connection is initiated by the requestor. For example, the target resource can perform an authentication. The information obtained during the authentication can be used by the virtual resource in redirecting the connection from the target resource to the virtual resource. In another illustrative example, the redirection of the connection can occur after the authentication when other actions have occurred such as checking a resource, processing a statement command or the target resource, or other actions.

The process records information in the connection redirected to the virtual resource to form recorded information (step 404). The process adjusts a security policy for handling connections in the network data processing system using the recorded information (step 406). The process terminates thereafter. With this process, attacks on the network data processing system are decreased using the security policy.

Figure 5:
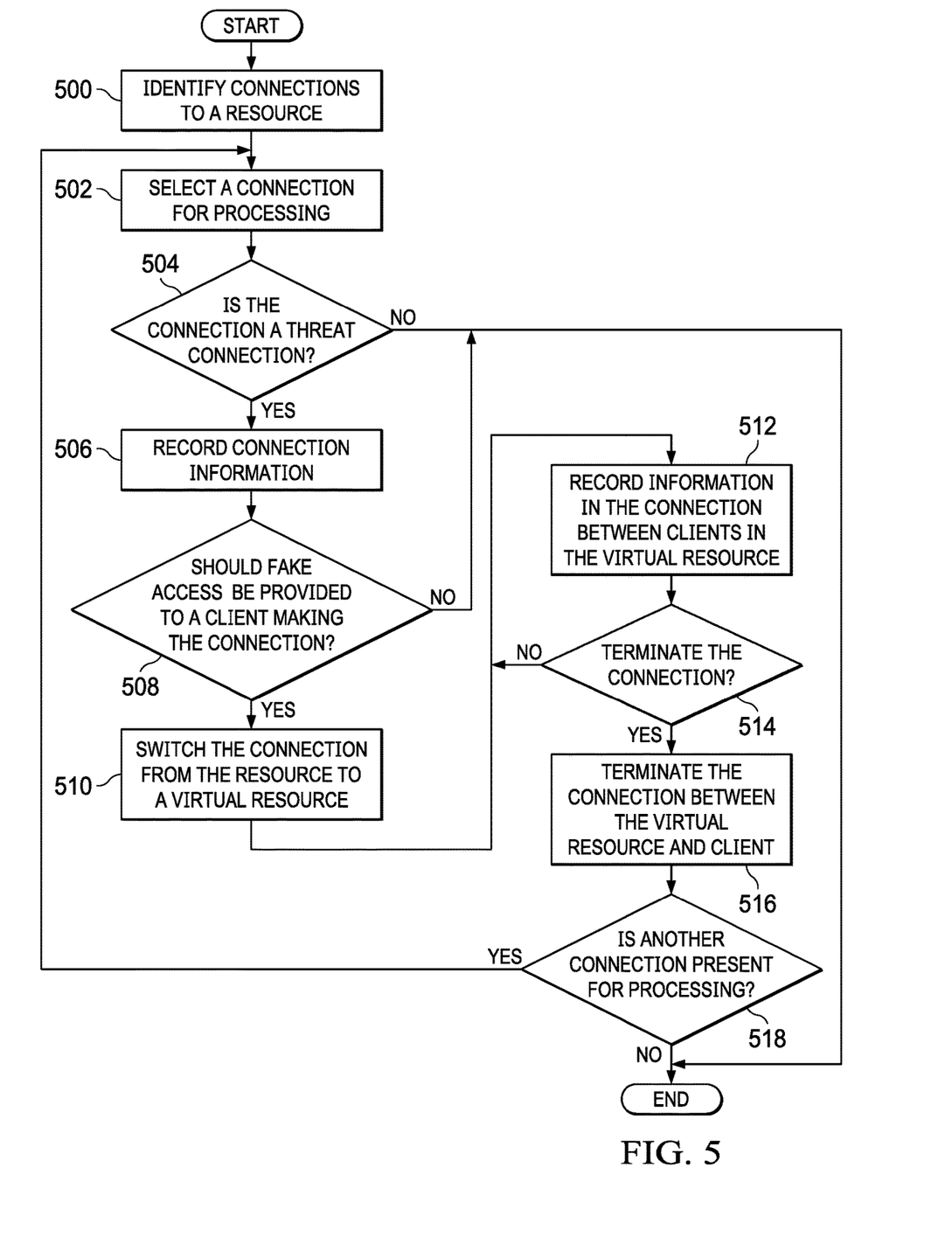
FIG. 5 is a more detailed flowchart of a process for handling security threats in accordance with an illustrative embodiment.

With reference to FIG. 5, a more detailed flowchart of a process for handling security threats is depicted in accordance with an illustrative embodiment. The process can be implemented in hardware, software, or some combination thereof. When implemented in software, the processes can take the form of program code that is run by one of more processor units located in one or more hardware devices in one or more computer systems. For example, these processes can be implemented in computer system 207 with connection manager 214 in FIG. 2.

The process begins by identifying connections to a resource (step 500). The process selects a connection for processing (step 502). The process determines whether the connection is a threat connection (step 504). If the connection is a threat connection, the process records connection information (step 506). In step 506, the connection information includes information about the connection. This includes, for example, an Internet protocol (IP) address, a browser identification, an operating system of the client, or other information that can be obtained from the connection between the resource and the client.

A determination is made as to whether to provide fake access to a client making the connection (step 508). If fake access is to be provided, the process switches the connection from the resource to a virtual resource (step 510).

The process records information in the connection between clients in the virtual resource (step 512). A determination is made as to whether to terminate the connection (step 514). The determination in step 514 can be made in a number of different ways. For example, whether to terminate the connection can be made based on at least one of a connection time, an amount of information, or specific information in the connection. For example, the connection may be terminated in response to recording information such as a specific sequence of actions, a specific command, a specific action, a number of actions that indicates a pattern, or some other information that can be used to determine whether to terminate a connection. This information can be defined in a rule in security policy 220 in FIG. 2.

In step 514, if the determination is made to terminate the connection, the process terminates the connection between the virtual resource and client (step 516). In step 516, the connection to the target resource is terminated without redirecting the connection to the virtual resource. In this case, the connection is a threat connection in which addition information is unnecessary.

A determination is made as to whether another connection is present for processing (step 518). If another connection is present, the process returns to step 502. Otherwise, the process terminates.

With reference again to step 514, if the connection is not to be terminated, the process returns to step 512. Referring back to step 504, if the connection is not a threat connection, the process terminates. In this case, the connection remains between the resource and the client. With reference again to step 508, if fake access is not to be provided, the process proceeds to step 516.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram. For example, in addition to determining the connection in step 516 in FIG. 5, the process can also send a warning message to an administrator or create an entry in a log.

Figure 6:
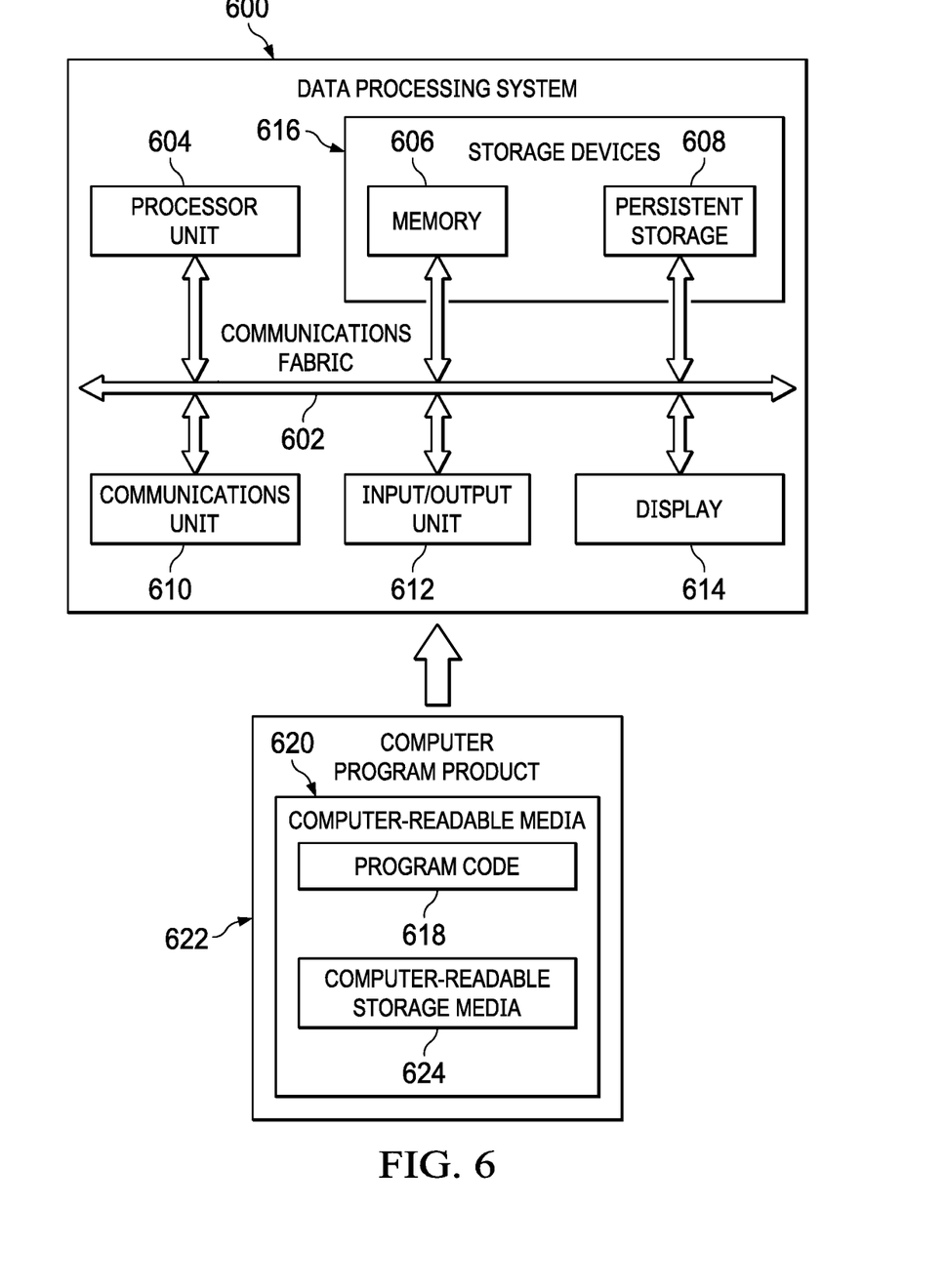
FIG. 6 is a block diagram of a data processing system in accordance with an illustrative embodiment.

Turning now to FIG. 6, a block diagram of a data processing system is depicted in accordance with an illustrative embodiment. Data processing system 600 can be used to implement server computer 104, server computer 106, and client devices 110 in FIG. 1. Data processing system 600 can also be used to implement computer system 207 in FIG. 2. In this illustrative example, data processing system 600 includes communications framework 602, which provides communications between processor unit 604, memory 606, persistent storage 608, communications unit 610, input/output (I/O) unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation.

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, may be, for example, a random-access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a solid-state drive (SSD), a flash memory, a rewritable optical disk, a rewritable magnetic tape, or some combination of the above. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer usable program code, or computer-readable program code that may be read and processed by a processor in processor unit 604. The program code in the different embodiments may be embodied on different physical or computer-readable storage media, such as memory 606 or persistent storage 608.

Program code 618 is located in a functional form on computer-readable media 620 that is selectively removable and may be loaded onto or transferred to data processing system 600 for processing by processor unit 604. Program code 618 and computer-readable media 620 form computer program product 622 in these illustrative examples. In the illustrative example, computer-readable media 620 is computer-readable storage media 624.

In these illustrative examples, computer-readable storage media 624 is a physical or tangible storage device used to store program code 618 rather than a medium that propagates or transmits program code 618.

Alternatively, program code 618 may be transferred to data processing system 600 using a computer-readable signal media. The computer-readable signal media may be, for example, a propagated data signal containing program code 618. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

Thus, illustrative embodiments of the present invention provide a computer-implemented method, a computer system, and a computer program product for handling security threats. A computer system determines a connection type for the connection in response to detecting a connection between a target resource in the network data processing system and a requestor. The computer system redirects the connection to a virtual resource in place of the target resource when the connection type is a threat connection, wherein the requestor originating the connection to the target resource is unable to perceive a redirection of the connection to the virtual resource. The computer system records information in the connection redirected to the virtual resource to form recorded information. The computer system adjusts a security policy for handling connections in the network data processing system using the recorded information, wherein the security threats in the network data processing system are decreased using the security policy.

Thus, the illustrative examples include one or more technical solutions that redirect connections from target resources to virtual resources such that the information about an attack can be collected from the connection. As a result, one or more technical solutions provide a technical effect of increasing the ability to identify security threats to the computer system or other components in a network data processing system. Further, one or more technical solutions provide a technical effect of reducing false identifications of security threats from refining security policies based on information gathered from connections that have been identified as threat connections.

In one illustrative example, one or more technical solutions provide a technical effect of protecting information in a target resource. For example, the target resource can be a database in which the database can contain personally identifiable information, financial information, business plans, client lists, or other information that may be considered confidential. With a connection manager, the security policy for a computer system or a network data processing system can be adjusted to be more accurate in identifying actual threats or attacks as compared to currently used techniques. In this manner, at least one of a computer system or a network data processing system is improved as compared to other computer systems or network data processing systems that do not include the connection manager.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for handling security threats in a network data processing system, the method comprising:
   responsive to a computer system detecting a connection between a target database server in the network data processing system and a requestor, determining, by the computer system, whether the connection between the target database server and the requestor is a threat connection or a normal connection based on applying a security policy to a set of actions performed by the requestor;
   responsive to determining that the connection is a threat connection, determining, by the computer system, a threat level associated with the threat connection based on the security policy;
   sending, by the computer system, based on the threat level, an alert message to an administrator;
   logging, by the computer system, based on the threat level, continuing access by the requestor via the connection;
   creating, by the computer system a fake connection by redirecting the connection from the target database server to a virtual security database server in response to the computer system determining that the connection is a threat connection, wherein the virtual security database server creates data packets that include information indicating that the data packets are from the target database server such that the requestor originating the connection to the target database server is unable to perceive a redirection of the connection from the target database server to the virtual security database server, and wherein the virtual security database server has tables that provide logically similar information to information stored in the target database server such that the virtual security database server is able to provide responses that appear to be information consistent with responses that would have been provided by the target database server, but with incorrect information;
   recording, by the computer system, information in the fake connection redirected from the target database server to the virtual security database server to form recorded information; and
   adjusting, by the computer system, the security policy for handling connections in the network data processing system using the recorded information, wherein the security threats in the network data processing system are decreased using the security policy.

2. The method of claim 1 further comprising:
   returning, by the computer system, responses to the requestor that are expected in which the responses include useless information.

3. The method of claim 1 further comprising:
   terminating, by the computer system, the fake connection after a desired amount of information is recorded from the fake connection to the virtual security database server.

4. The method of claim 1 further comprising:
   analyzing, by the computer system, the recorded information for the fake connection redirected from the target database server to the virtual security database server.

5. The method of claim 1 further comprising:
   continuing, by the computer system, to allow access to the target database server using the connection in response to the computer system determining that the connection is a normal connection.

6. A computer system for handling security threats in a network data processing system, the computer system comprising:
   a bus system;
   a storage device connected to the bus system, wherein the storage device stores program instructions; and
   a processor connected to the bus system, wherein the processor executes the program instructions to:
     determine whether a connection between a target database server and a requestor is a threat connection or a normal connection based on applying a security policy to a set of actions performed by the requestor in response to detecting the connection between the target database server in the network data processing system and the requestor;
     responsive to determining that the connection is a threat connection, determine a threat level associated with the threat connection based on the security policy;
     send, based on the threat level, an alert message to an administrator;
     log, based on the threat level, continuing access by the requestor via the connection;
     create a fake connection by redirecting the connection from the target database server to a virtual security database server in response to the computer system determining that the connection is a threat connection, wherein the virtual security database server creates data packets that include information indicating that the data packets are from the target database server such that the requestor originating the connection to the target database server is unable to perceive a redirection of the connection from the target database server to the virtual security database server, and wherein the virtual security database server has tables that provide logically similar information to information stored in the target database server such that the virtual security database server is able to provide responses that appear to be information consistent with responses that would have been provided by the target database server, but with incorrect information;

record information in the fake connection redirected from the target database server to the virtual security database server to form recorded information; and adjust the security policy for handling connections in the network data processing system using the recorded information, wherein the security threats in the network data processing system are decreased using the security policy.

7. The computer system of claim 6, wherein the virtual security database server returns responses to the requestor that are expected in which the responses include useless information.

8. The computer system of claim 6, wherein the processor further executes the program instructions to:

terminate the fake connection after a desired amount of information is recorded from the fake connection to the virtual security database server.

9. The computer system of claim 6, wherein the processor further executes the program instructions to:

analyze the recorded information for the fake connection redirected from the target database server to the virtual security database server.

10. The computer system of claim 6, wherein the processor further executes the program instructions to:

continue to allow access to the target database server using the connection in response to the determining that the connection is a normal connection.

11. A computer program product for handling security threats in a network data processing system, the computer program product comprising:

a computer-readable storage media storing program code, the program code comprising;

program code responsive to detecting a connection between a target database server in the network data processing system and a requestor, for determining whether the connection between the target database server and the requestor is a threat connection or a normal connection based on applying a security policy to a set of actions performed by the requestor;

program code for determining, responsive to determining that the connection is a threat connection, a threat level associated with the threat connection based on the security policy;

program code for sending, based on the threat level, an alert message to an administrator;

program code for logging, based on the threat level, continuing access by the requestor via the connection;

program code for creating a fake connection by redirecting the connection from the target database server to a virtual security database server in response to determining that the connection is a threat connection, wherein the virtual security database server creates data packets that include information indicating that the data packets are from the target database server such that the requestor originating the connection to the target database server is unable to perceive a redirection of the connection from the target database server to the virtual security database server, and wherein the virtual security database server has tables that provide logically similar information to information stored in the target database server such that the virtual security database server is able to provide responses that appear to be information consistent with responses that would have been provided by the target database server, but with incorrect information;

program code for recording information in the fake connection redirected from the target database server to the virtual security database server to form recorded information; and program code for adjusting the security policy for handling connections in the network data processing system using the recorded information, wherein the security threats in the network data processing system are decreased using the security policy.

12. The computer program product of claim 11 further comprising:

program code for terminating the fake connection after a desired amount of information is recorded from the fake connection to the virtual security database server.

13. The computer program product of claim 11 further comprising:

program code for continuing to allow access to the target database server using the connection in response to the determining that the connection is a normal connection.

14. The method of claim 1 wherein the recorded information comprises at least one of: a sequence of actions directed at the target database server and data derived from actions directed at the target database server.

15. The computer system of claim 6 wherein the recorded information comprises at least one of: a sequence of actions directed at the target database server and data derived from actions directed at the target database server.

16. The computer program product of claim 11 wherein the recorded information comprises at least one of: a sequence of actions directed at the target database server and data derived from actions directed at the target database server.

17. The method of claim 1 wherein the recorded information comprises user profile information, wherein the user profile information comprises one or more of: a connection program, a network protocol, an Internet protocol (IP) address, a browser identification, computer system information, a connection time, a structured query language (SQL) statement content, database objects requested, a sequence of SQL statements, types of actions, a sequence of actions.

18. The computer system of claim 6 wherein the recorded information comprises user profile information, wherein the user profile information comprises one or more of: a connection program, a network protocol, an Internet protocol (IP) address, a browser identification, computer system information, a connection time, a structured query language (SQL) statement content, database objects requested, a sequence of SQL statements, types of actions, a sequence of actions.

19. The computer program product of claim 11 wherein the recorded information comprises user profile, information wherein the user profile information comprises one or more of: a connection program, a network protocol, an Internet protocol (IP) address, a browser identification, computer system information, a connection time, a structured query language (SQL) statement content, database objects requested, a sequence of SQL statements, types of actions, a sequence of actions.

20. The method of claim 4 wherein the analyzing is performed by the computer system using artificial intelligence.

\* \* \* \* \*